United States Patent
Kurai et al.

(10) Patent No.: US 7,104,122 B2
(45) Date of Patent: Sep. 12, 2006

(54) METHOD OF ADJUSTING STRAIGHT AHEAD TRAVELING CAPABILITY OF VEHICLE

(75) Inventors: Kenichiro Kurai, Tochigi-ken (JP); Sumio Noguchi, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 145 days.

(21) Appl. No.: 10/514,232

(22) PCT Filed: Apr. 28, 2003

(86) PCT No.: PCT/JP03/05462

§ 371 (c)(1),
(2), (4) Date: Nov. 18, 2004

(87) PCT Pub. No.: WO03/097430

PCT Pub. Date: Nov. 27, 2003

(65) Prior Publication Data

US 2005/0188753 A1 Sep. 1, 2005

(30) Foreign Application Priority Data

May 22, 2002 (JP) .............................. 2002-147383

(51) Int. Cl.
*G01M 17/02* (2006.01)
(52) U.S. Cl. ...................................................... 73/146
(58) Field of Classification Search .................. 73/146
See application file for complete search history.

(56) References Cited

U.S. PATENT DOCUMENTS

| | | | | |
|---|---|---|---|---|
| 4,385,518 A | * | 5/1983 | Rickett | 73/117 |
| 5,000,038 A | * | 3/1991 | Katt | 73/117 |
| 5,101,660 A | * | 4/1992 | La Belle | 73/117 |
| 5,323,644 A | * | 6/1994 | Schaefer | 73/117 |
| 5,375,461 A | * | 12/1994 | Suzuki | 73/117 |
| 5,542,290 A | * | 8/1996 | Suzuki | 73/117 |
| 5,655,262 A | * | 8/1997 | Sterin et al. | 19/200 |

FOREIGN PATENT DOCUMENTS

JP     1-182172 A     7/1989

(Continued)

*Primary Examiner*—Edward Lefkowitz
*Assistant Examiner*—Andre Allen
(74) *Attorney, Agent, or Firm*—Arent Fox PLLC

(57) ABSTRACT

This invention is intended to enable performing a vehicle straight-line performance adjustment operation surely in a short time without the need of operator's skill. An actually moving state of a vehicle completed with an alignment adjustment is reproduced after the vehicle is mounted on rollers of a bench tester, and the side force of each of wheels at this time is measured, it is determined whether or not the measured side force is within a preset reference range, it is determined whether or not the side force of the wheel, which has been determined to be out of the reference range, is within the reference range when a toe angle of the wheel is corrected within a preset toe angle correction allowable range, the toe angle is corrected within the correction allowable range when it is determined that the side force falls within the reference range, and the side force is corrected to fall within the reference range, the side force of the each wheel after the toe angle is corrected is obtained, a drift amount of the vehicle is calculated from the obtained side force of the each wheel, and it is determined whether or not the vehicle has a good straight-line performance based on the calculated drift amount.

2 Claims, 2 Drawing Sheets

FOREIGN PATENT DOCUMENTS

| | | |
|---|---|---|
| JP | 6-273284 A | 9/1994 |
| JP | 06-331505 | 12/1994 |
| JP | 07-005076 | 1/1995 |
| JP | 09-210863 | 8/1997 |
| JP | 2000-111454 A | 4/2000 |
| JP | 2003-4595 A | 1/2003 |

* cited by examiner

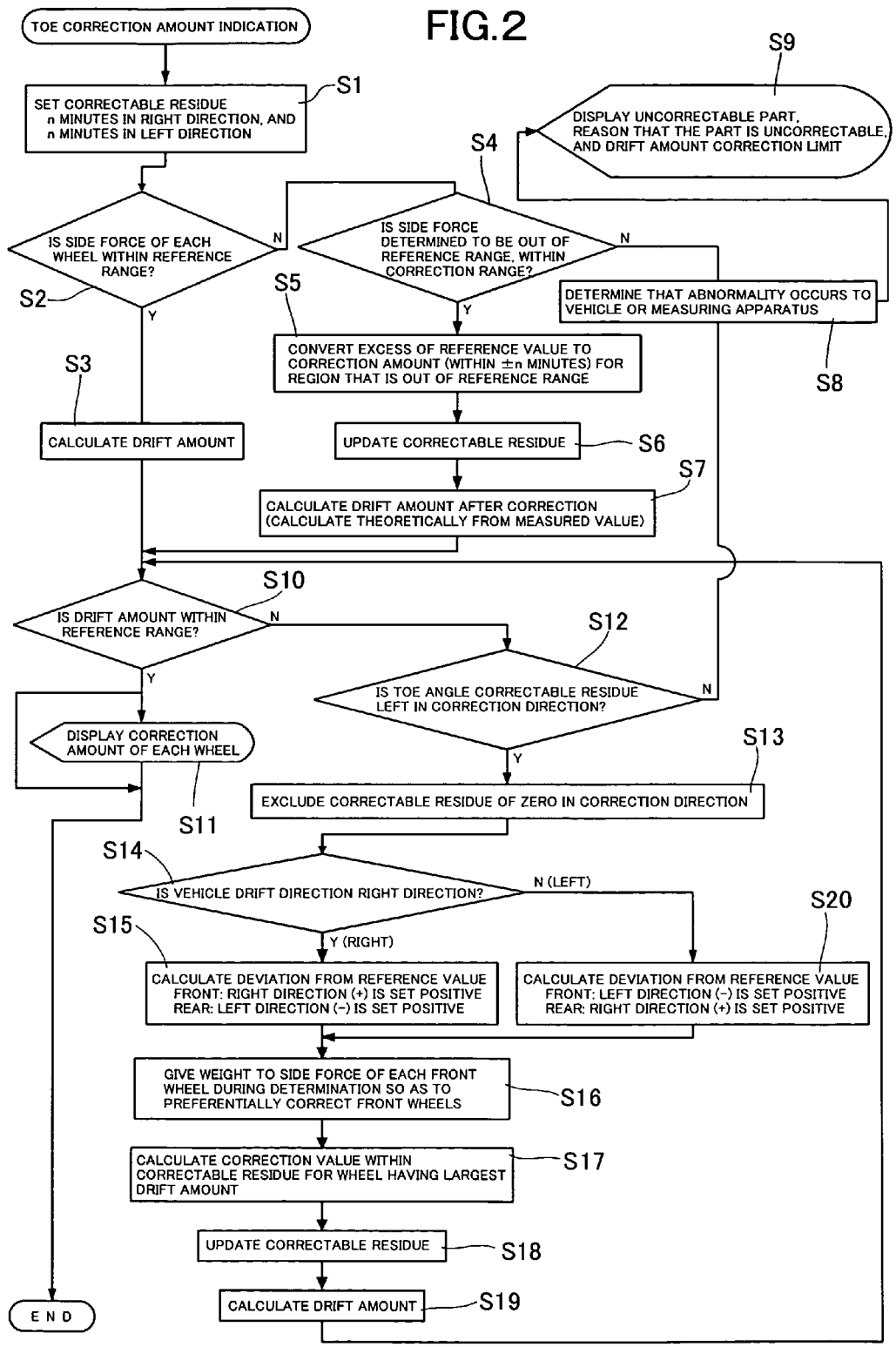

METHOD OF ADJUSTING STRAIGHT AHEAD TRAVELING CAPABILITY OF VEHICLE

TECHNICAL FIELD

The present invention relates to a vehicle straight-line performance adjusting method including setting a vehicle completed with an alignment adjustment into a straight-line tracking state, reproducing an actually moving state of the vehicle on a bench tester, calculating a drift amount of the vehicle based on side forces of respective four wheels at this time, calculating a correction amount of a toe angle based on a relationship between this drift amount and the side force of each wheel, and thereby performing an alignment adjustment.

BACKGROUND ART

As a conventional vehicle straight-line performance adjustment method of this type, a method including determining a drift of a vehicle based on whether an input of a load cell that measures the side force is equal to or lower than a specified value or equal to or larger than the specified value, allowing an operator to adjust a balance so as to reduce the drift amount, and measuring the side force again is disclosed in, for example, Japanese Patent Application Laid-Open No. H6-331505.

With such a conventional method, however, adjustment and measurement are performed several times repeatedly, so that an accurate adjustment value cannot be indicated to the operator. The adjustment operation, therefore, relies on the operator, with the result that an accurate drift amount cannot be acquired.

A technique for making an alignment adjustment so as to minimize a force in a roller rotation axis direction, measuring a stability with high accuracy, and enabling easily adjusting the straight-line performance of the vehicle without the need for each manufacturer to refer to a target alignment value set for each vehicle type is disclosed in, for example, Japanese Patent Application Laid-Open No. H7-5076.

This conventional technique has, however, the following disadvantages. It is necessary to adjust all wheels so as to perform the alignment adjustment. It takes lots of time for an adjustment operation. Each manufacturer fails to refer to the target value set for each vehicle type.

A technique for detecting a moving amount of each abutment body that abuts on a side surface of a vehicle, and making a toe adjustment so that the moving amount is equal to or smaller than a certain value, wherein a vehicle toe adjustment is performed while a position of the abutment member is adjusted so that an abutment pressure of the abutment body is equal to each other on right and left side of the vehicle, is disclosed in, for example, Japanese Patent Application Laid-open No. H9-210863.

This technique has, however, the following disadvantages. The toe adjustment can be made in a free state equal to an actually moving state of the vehicle by abutting right and left abutment bodies on the vehicle with a constant force while moving the right and left abutment bodies. Similarly to the technique described in the Japanese Patent Application Laid-Open No. H6-331505, therefore, an accurate adjustment value cannot be indicated to an operator. As a result, an adjustment operation relies on the operator, and an accurate drift amount cannot be acquired.

A technical theme of the present invention has been achieved in light of the conventional disadvantages. It is an object of the present invention to provide a vehicle straight-line performance adjusting method capable of performing an adjustment operation for a vehicle straight-line performance surely in a short time without the need of operator's skill.

DISCLOSURE OF THE INVENTION

To obtain the object, a vehicle straight-line performance adjusting method according to the present invention is characterized by comprising steps of: reproducing an actually moving state of a vehicle which has been subjected to an alignment adjustment after the vehicle is mounted on rollers of a bench tester, and measuring the side force of each of wheels at this time; determining whether or not the measured side force is within a preset reference range; determining whether or not the side force of the wheel, which has been determined to be out of the reference range, is within the reference range when a toe angle of the wheel is corrected within a preset toe angle correction allowable range; correcting the toe angle within the correction allowable range when it is determined that the side force falls within the reference range, and correcting the side force to fall within the reference range; obtaining the side force of the each wheel after the toe angle is corrected, and calculating a drift amount of the vehicle from the obtained side force of the each wheel; and determining whether or not the vehicle has a good straight-line performance based on the calculated drift amount.

With the straight-line performance adjusting method, only the toe angle of the wheel the side force of which is out of the reference range is adjusted. It is not, therefore, always necessary to adjust all the wheels. Accordingly, an adjustment amount can be indicated to the operator with a smallest number of correction target parts, and the straight-line performance can be improved quickly, highly accurately in a short time.

Further, a vehicle straight-line performance adjusting method according to the present invention is characterized by comprising steps of: reproducing an actually moving state of a vehicle which has been subjected to an alignment adjustment after the vehicle is mounted on rollers of a bench tester, and measuring the side force of each of wheels at this time; calculating a drift amount of the vehicle from the measured side force of the each wheel; determining whether or not the vehicle has a good straight-line performance based on the calculated drift amount; setting correction directions of front and rear wheels from a drift direction of the vehicle when it is determined that the vehicle does not have the good straight-line performance, and correcting the side force based on a toe angle of the wheel having a large deviation from the side force reference value; obtaining the side force after the correction, re-calculating the drift amount of the vehicle, and determining whether or not the vehicle has the good straight-line performance based on this calculated drift amount.

With the straight-line performance adjustment method, the side force of the wheel which has the large deviation from the side force reference value is preferentially corrected based on the toe angle. It is not, therefore, always necessary to adjust all the wheels. Accordingly, an adjustment amount can be indicated to the operator with a smallest number of correction target parts, and the straight-line performance can be improved quickly, highly accurately in a short time.

BRIEF DESCRIPTION OF THE DRAWINGS

FIG. 2 is a flowchart which shows a toe angle correcting method in the embodiment of the vehicle straight-line performance adjusting method according to the present invention.

BEST MODE FOR CARRYING OUT THE INVENTION

An embodiment of the present invention will be described hereinafter in detail with reference to the drawings.

Figure 1:
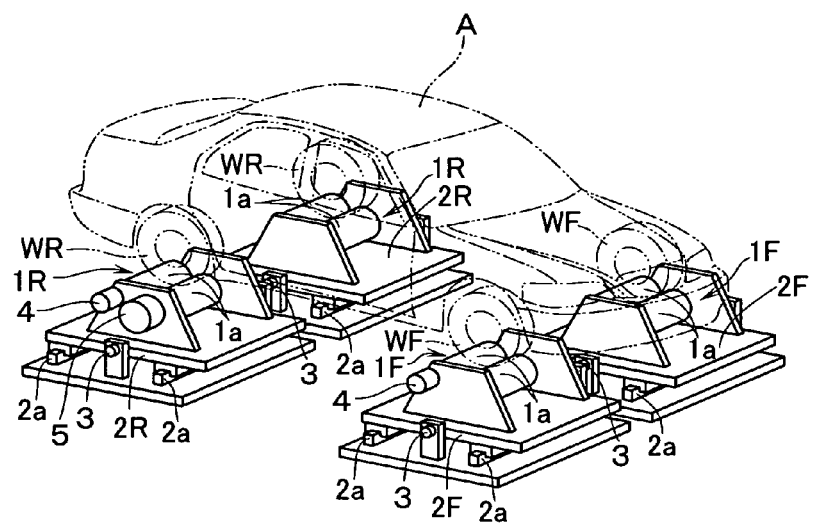
FIG. 1 is a perspective view of a bench tester employed in an embodiment of a vehicle straight-line performance adjusting method according to the present invention.

FIG. 1 depicts a bench tester employed in the embodiment of a vehicle straight-line performance adjusting method according to the present invention. This bench tester includes a pair of right and left front wheel rollers 1F on which right and left front wheels WF of a vehicle A completed with an alignment adjustment are mounted, respectively, and a pair of right and left rear wheel rollers 1R on which right and left rear wheels WR of the vehicle A completed with the alignment adjustment are mounted, respectively.

Each of the front wheel rollers 1F and the rear wheel rollers 1R is composed by front and rear divided rollers 1a pivotally supported by a roller support frame 2F or 2R. Each of the roller support frames 2F and 2R is movably supported in a lateral direction along a slide rail 2a, and is provided with a detector 3, e.g., a load cell, that detects the side force acting on each roller 1F or 1R through the roller support frame 2F or 2R.

In addition, a speedometer 4 that detects a rotation speed of each roller 1F or 1R, a motor 5 that drives the roller 1R for the rear wheel WR serving as a driven wheel, and a computer, not shown, which inputs signals from the detector 3 and the speedometer 4 are provided.

In the vehicle straight-line performance adjusting method employing such a bench tester, the right and left front wheels WF of the vehicle A are mounted first on the right and left paired front wheel rollers 1F of the bench tester, respectively, and the right and left rear wheels WR of the vehicle A are mounted next on the right and left paired rear wheel rollers 1R of the bench tester, respectively.

Next, a measurement start button is turned on based on an indication that the measurement start button be depressed. If so, while a steering wheel of the vehicle A is set at a straight-line position, the vehicle A is constrained so as not to laterally displace the vehicle A, the front wheels WF serving as driving wheels are rotated by an on-vehicle engine, and the rear wheels WR serving as the driven wheels are rotated at a uniform velocity to a velocity of the front wheels WF through the rollers 1R by the motors 5, respectively. An drift amount of the vehicle A is calculated, and a toe angle is corrected based on this drift amount.

As a toe angle correcting method, as shown in FIG. 2, a toe angle correctable range (i.e., correctable residue) of each tire of the vehicle A at a maximum n minutes right and left, respectively (at S1). It is noted that n is determined based on a vehicle type setting allowable range, an accuracy of an alignment measuring apparatus, and the like.

Next, the side force generated on a tire tread surface of each wheel is measured by the detector (load cell) 3, and it is determined whether or not the measured side force is within a reset reference range (at S2). When the side force is within the reference range, the drift amount of the vehicle A at that time is calculated (at S3). When the calculated drift amount is within a preset reference range (S10), a routine is finished.

When it is determined at the step S2 that the side force is not within the reference range, but the side force can fall within the reference range by correcting the toe angle within the n minutes (at S4), the toe angle is corrected by a minimum correction amount for causing the side force to fall within the reference range (at S5). The toe angle used for the correction is subtracted from a preset toe angle correctable residue, thereby updating the toe angle correctable residue (at S6).

Thereafter, the drift amount of the vehicle after the toe angle correction is calculated at S7. When this drift amount is within the reference range (at S10), the correction amount of the toe angle of each vehicle is displayed (at S11), thus finishing the routine.

When it is determined at the step S4 that the side force is unlikely within the reference range even if the toe angle is corrected by the maximum n minutes, it is determined that an abnormality occurs to the vehicle A or the measuring apparatus (at S8). In addition, a uncorrectable part, a reason that the part is uncorrectable, and a drift amount correction limit are displayed (at S9).

When it is determined at the step S10 that the drift amount is not within the reference range, it is first determined whether or not the toe angle correctable residue is left in a correction direction (at S12). When it is left, the correctable residue of zero in the correction direction is excluded (at S13).

Figure 3:
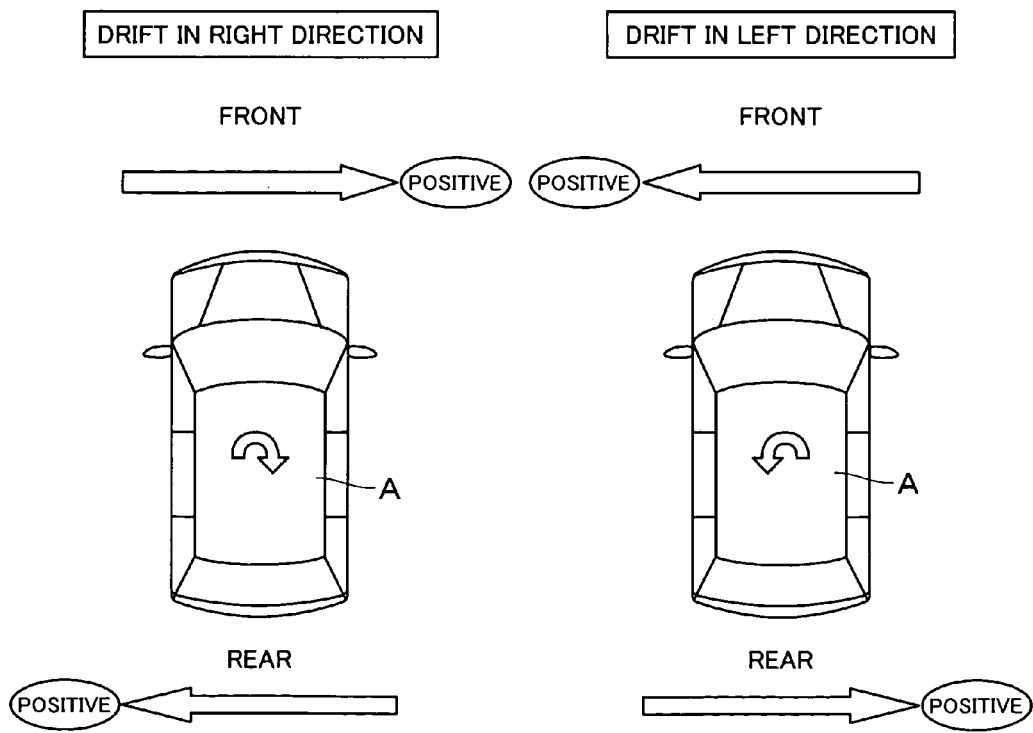
FIG. 3 shows wheel correction directions in FIG. 2.

When a drift direction of the vehicle A is a right direction (at S14), a deviation of the drift amount from a reference value is calculated. In this case, as shown in FIG. 3, When the vehicle A drifts in the right direction, a front in the right direction is set positive and a rear in a left direction is set positive (at S15). In order to preferentially correct the front wheels, a weight is given to the side force of each front wheel (at S16).

The toe angle of the wheel on which the vehicle A has a largest drift amount is corrected within the correctable residue, thereby calculating a correction amount (at S17). Thereafter, the correctable residue is updated (at S18). The drift amount of the vehicle A after the toe angle correction is calculated (at S19). It is then determined whether or not the drift amount is within the reference range (at S10). When the drift amount is within the reference range, the routine is finished.

When it is determined at the step S14 that the drift direction of the vehicle A is the left direction (at the S14), the front in the left direction is set positive and the rear in the right direction is set positive (at S20) and the processing goes to the step S16.

In this case, When the toe angle of only one of the front wheels cannot be corrected, the wheel having the second largest deviation is similarly corrected. Although the front wheels are preferentially corrected, a highest priory is basically put on the wheel having the large deviation.

As stated above, the vehicle straight-line performance adjusting method in this embodiment includes the steps of setting the vehicle A completed with the alignment adjustment into a straight-line state, reproducing the actually moving state of the vehicle A on the bench tester, calculating the drift amount of the vehicle A based on the side force of each of the four wheels at this time, calculating the toe angle correction amount based on the relationship between this drift amount and the side force of each wheel, and adjusting the straight-line performance of the vehicle A to be subjected to the alignment adjustment. It is thereby possible to quickly and accurately adjust the straight-line performance of the vehicle A within the specified adjustment range of the toe angle.

As can be understood from the description given so far, according to the present invention, the toe angle correction is conducted preferentially on the wheel the side force of which is out of the reference range and the wheel the drift amount for which is large. It is not, therefore, always necessary to adjust all the wheels, so that a straight-line performance adjustment operation can be performed with a smallest number of correction target parts, with high accuracy in a short time.

Moreover, the toe angle adjustment amount can be quantitatively indicated to the operator. Therefore, the straight-line performance adjustment operation can be performed surely and easily without the need of operator's skill.

The invention claimed is:

1. A vehicle straight-line performance adjusting method characterized by comprising steps of:

reproducing an actually moving state of a vehicle which has been subjected to an alignment adjustment after the vehicle is mounted on rollers of a bench tester, and measuring the side force of each of wheels at this time;

determining whether or not the measured side force is within a preset reference range;

determining whether or not the side force of the wheel, which has been determined to be out of said reference range, is within said reference range when a toe angle of the wheel is corrected within a preset toe angle correction allowable range;

correcting the toe angle within the correction allowable range when it is determined that the side force falls within the reference range, and correcting the side force to fall within the reference range;

obtaining the side force of the each wheel after the toe angle is corrected, and calculating a drift amount of the vehicle from the obtained side force of the each wheel; and determining whether or not the vehicle has a good straight-line performance based on the calculated drift amount.

2. A vehicle straight-line performance adjusting method characterized by comprising steps of:

reproducing an actually moving state of a vehicle which has been subjected to an alignment adjustment after the vehicle is mounted on rollers of a bench tester, and measuring the side force of each of wheels at this time;

calculating a drift amount of the vehicle from the measured side force of the each wheel;

determining whether or not the vehicle has a good straight-line performance based on the calculated drift amount;

setting correction directions of front and rear wheels from a drift direction of the vehicle when it is determined that the vehicle does not have the good straight-line performance, and correcting the side force based on a toe angle of the wheel having a large deviation from the side force reference value;

obtaining the side force after the correction, re-calculating the drift amount of the vehicle, and determining whether or not the vehicle has the good straight-line performance based on this calculated drift amount.

* * * * *

UNITED STATES PATENT AND TRADEMARK OFFICE
CERTIFICATE OF CORRECTION

| | |
|---|---|
| PATENT NO. | : 7,104,122 B2 |
| APPLICATION NO. | : 10/514232 |
| DATED | : September 12, 2006 |
| INVENTOR(S) | : Kenichiro Kurai et al. |

It is certified that error appears in the above-identified patent and that said Letters Patent is hereby corrected as shown below:

Title Page, item (75) Inventors: add the third inventors name and residence as follows:

--Kiyonobu HARA, Tochigi-ken, Japan--

Signed and Sealed this

Nineteenth Day of December, 2006

JON W. DUDAS
*Director of the United States Patent and Trademark Office*